(No Model.)
C. P. GOERZ & E. VON HÖEGH.
LENS FOR OPTICAL PURPOSES.
No. 535,897.                           Patented Mar. 19, 1895.
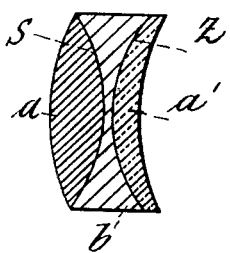
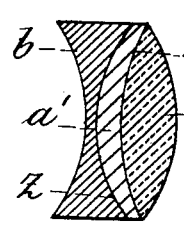
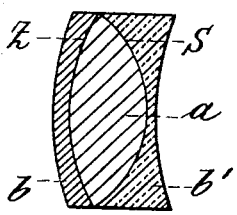
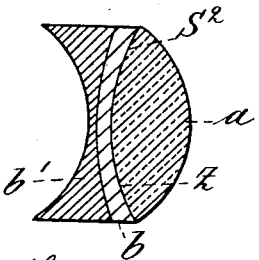
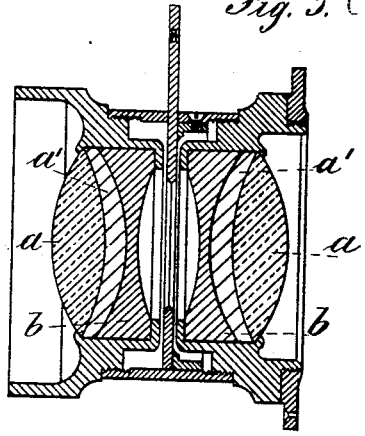
Witnesses:
Inventors:
Carl Paul Goerz.
Emil von Höegh.
By
Atty.

United States Patent Office.

CARL PAUL GOERZ, OF SCHÖNEBERG, AND EMIL VON HÖEGH, OF WILMERSDORF, GERMANY.

LENS FOR OPTICAL PURPOSES.

SPECIFICATION forming part of Letters Patent No. 535,897, dated March 19, 1895.

Application filed January 2, 1895. Serial No. 533,544. (No model.)

*To all whom it may concern:*

Be it known that we, CARL PAUL GOERZ, of Schöneberg, and EMIL VON HÖEGH, of Wilmersdorf, both near Berlin, Germany, have invented certain new and useful Improvements in and Relating to Lenses for Optical Purposes; and we do hereby declare the following to be a clear and exact description of the invention.

This invention relates to lenses for optical purposes, and it has for its object the production of a lens free from chromatic, spherical and astigmatic aberrations, as will now be fully described, reference being had to the accompanying drawings, in which—

Figures 1 to 4 are sectional views of compound lenses, Figs. 1 and 3 illustrating known combinations, while Figs. 2 and 4 illustrate combinations embodying our invention. Fig. 5 is a sectional view illustrating two of our improved compound lenses combined into an objective for photographic purposes.

Similar letters of reference indicate like parts wherever such may occur in the figures of drawings above described.

In Letters Patent of the United States granted to us on the 30th of October, 1894, No. 528,155, we have fully described and illustrated compound lenses free from chromatic, spherical and astigmatic aberrations, said lenses being composed of three lenses two of the proximate surfaces of which have a converging or light collecting action for the purpose of compensating astigmatic aberrations, while the other proximate surfaces have a light diverging action for the purpose of compensating spherical aberrations, the lens being composed either of a negative lens $b$, interposed between two positive lenses $a$ $a'$, Fig. 1, of which positive lenses one has a greater and the other a less refractive power respectively than the interposed negative lens; or of a positive lens $a$ interposed between two negative lenses $b$ $b'$, Fig. 3, said negative lenses having a greater and less refractive power respectively than the interposed positive lens.

We have discovered that the greatest possible uniformity in the sharpness of the image surface is obtained by varying the described combinations, either by juxtapositing the two negative lenses in a trio composed of two negative and one positive lens, or by juxtapositing the two positive lenses in a trio composed of two positive and a negative lens, provided always, that the requirements described in aforesaid Letters Patent are present, namely: that of the four proximate faces two of them will have a diverging and two a converging action, and that the juxtaposited lenses of like denomination or name will have a greater and less refractive power respectively than the lens of unlike denomination or name. Thus in the known lens, Fig. 1, the proximate surfaces S between the lenses $a$ $b$ have a converging or light collecting action, because the lens $a$ presents a convex surface to the concave surface of the lens $b$ whose refractive power is less than that of lens $a$. On the contrary, the proximate surfaces Z of lenses $b$ and $a'$ have a diverging or light distributing action, because the lens $a'$ presents a convex surface to the concave surface of lens $b$ whose refractive power is greater than that of said lens $a'$.

By transposing lens $a$ from the left of lens $b$, Fig. 1, to the right of lens $a'$ Fig. 2, the action of the proximate surfaces Z of lenses $b$ $a'$ will remain the same, *i. e.*, diverging or light distributing, as in Fig. 1, since no change has taken place in their surfaces by the displacement of lens $a$. The proximate surfaces S' of lenses $a$ $a'$ will have a converging or light collecting action, for the reasons above explained in reference to the proximate surfaces S of lenses $a$ $b$, Fig. 1. It will therefore be readily seen that all the conditions necessary for the compensation of spherical and astigmatic aberrations are also present in this our improved system of lenses, the only difference being that in the system shown in Figs. 1 and 3 two lenses of like denomination or name inclose one of unlike denomination, while in our present system two lenses of like denomination are directly combined, and with one of said lenses is combined a lens of unlike denomination. The refractive power of the individual lenses remains unchanged, that is to say, one of the positive lenses will have a greater and the other a less refractive power than the negative lens.

In our said Letters Patent it is also stated that the combination of two positive lenses with an interposed negative lens, Fig. 1, may be reversed, and that a positive lens $a$ may be interposed between two negative lenses $b$ $b'$, Fig. 3. So in our improved system of lenses may two negative lenses $b$ $b'$ be directly combined or juxtaposited, the positive lens $a$ being combined with one of said negative lenses, as for instance by transposing lenses $a$ $b$ from the right of lens $b'$ Fig. 3, to the left thereof, Fig. 4, without thereby changing any of the properties of the individual lenses or of their proximate surfaces.

In Fig. 5 we have shown two of our improved lenses combined for use as an objective for photographic purposes, the individual lenses being arranged as shown in Fig. 2.

Having thus described our invention and in what manner the same is to be performed, what we claim as new therein, and desire to secure by Letters Patent, is—

1. A compound lens, consisting of two juxtaposited lenses of like name and a lens of unlike name combined with one of said lenses of like name the juxtaposited lenses of like name having a greater and less refractive power respectively than the lens of unlike name for the purpose set forth.

2. A photographic objective consisting of two sets of lenses each composed of two juxtaposited lenses of like name and a lens of unlike name combined with one of said lenses of like name, the juxtaposited lenses of like name having a greater and less refractive power respectively than the lens of unlike name, for the purpose set forth.

3. A photographic objective consisting of two sets of lenses each composed of two juxtaposited lenses of like name and a lens of unlike name combined with one of said lenses of like name, the juxtaposited lenses of like name having a greater and less refractive power respectively than the lens of unlike name and the outer lenses having their outer surfaces curved in the same direction, for the purpose set forth.

In testimony whereof we have affixed our signatures in presence of two witnesses.

CARL PAUL GOERZ.
EMIL VON HÖEGH.

Witnesses:
RICHARD SCHMIDT,
MAX BIENERT.